(12) United States Patent
Fang et al.

(10) Patent No.: US 8,582,688 B2
(45) Date of Patent: Nov. 12, 2013

(54) METHOD, APPARATUS, AND SYSTEM FOR CHANNEL ESTIMATION

(75) Inventors: Liming Fang, Shenzhen (CN); Dong Wei, Austin, TX (US); Zihuan Chen, Shenzhen (CN); Raphael Cendrillon, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/971,389

(22) Filed: Dec. 17, 2010

(65) Prior Publication Data

US 2011/0090978 A1    Apr. 21, 2011

Related U.S. Application Data

(63) Continuation of application No. PCT/CN2009/071246, filed on Apr. 13, 2009.

(30) Foreign Application Priority Data

Jun. 20, 2008  (CN) .......................... 2008 1 0067958

(51) Int. Cl.
*H04L 27/28*        (2006.01)
(52) U.S. Cl.
USPC .......................................... 375/296; 370/201
(58) Field of Classification Search
USPC ........... 375/260, 295, 296, 222; 455/63.1, 69, 455/24, 135, 296; 370/201, 203
See application file for complete search history.

(56) References Cited

U.S. PATENT DOCUMENTS

| | | |
|---|---|---|
| 6,480,487 B1 | 11/2002 | Wegleitner et al. |
| 2003/0128656 A1* | 7/2003 | Scarpa ........................... 370/203 |
| 2005/0105589 A1* | 5/2005 | Sung et al. .................... 375/130 |
| 2006/0280238 A1* | 12/2006 | Cioffi et al. ................... 375/222 |
| 2007/0189402 A1 | 8/2007 | Yang |
| 2008/0049855 A1 | 2/2008 | Duvaut et al. |
| 2008/0071516 A1 | 3/2008 | Cioffi et al. |

(Continued)

FOREIGN PATENT DOCUMENTS

| | | |
|---|---|---|
| CN | 1437338 | 8/2003 |
| CN | 1525672 | 9/2004 |

(Continued)

OTHER PUBLICATIONS

Duvaut, P. et al., *Adaptive Off-Diagonal MIMO Pre-coder (ODMP) for Downstream DSL Self FEXT Cancellation*, IEEE GLOBECOM 2007, pp. 2910-2915.

(Continued)

*Primary Examiner* — Aristocratis Fotakis
(74) *Attorney, Agent, or Firm* — Staas & Halsey LLP

(57) ABSTRACT

In the field of communications technologies, a method, an apparatus, and a system for channel estimation are provided. The method for channel estimation includes the following steps. An error signal returned by a terminal is received, where the error signal is an error signal of at least two tones in a downlink frequency band. Channels of the at least two tones are obtained according to the error signal. The channels of the at least two tones are interpolated, and channels of remaining tones in the downlink frequency band are obtained. In the method, the apparatus, and the system for channel estimation, a convergence speed of the channel estimation is improved by reducing data of error signals returned by the terminal.

13 Claims, 5 Drawing Sheets

(56) References Cited

U.S. PATENT DOCUMENTS

| | | | |
|---|---|---|---|
| 2008/0188185 A1 | 8/2008 | Shi | |
| 2008/0285740 A1* | 11/2008 | Schelstraete et al. | 379/406.06 |
| 2009/0059780 A1* | 3/2009 | De Lind Van Wijngaarden et al. | 370/201 |
| 2009/0092036 A1* | 4/2009 | Peeters et al. | 370/201 |
| 2009/0116582 A1* | 5/2009 | Ashikhmin et al. | 375/296 |
| 2009/0147666 A1 | 6/2009 | Fang et al. | |
| 2009/0245081 A1* | 10/2009 | Ashikhmin et al. | 370/201 |
| 2010/0303136 A1* | 12/2010 | Ashikhmin et al. | 375/222 |

FOREIGN PATENT DOCUMENTS

| | | |
|---|---|---|
| CN | 1677909 | 10/2005 |
| CN | 1791084 | 6/2006 |
| CN | 1863099 | 11/2006 |
| CN | 1309192 | 4/2007 |
| CN | 1968242 | 5/2007 |
| CN | 101196659 | 3/2008 |
| EP | 2136477 A1 | 12/2009 |
| WO | 2007/130877 | 11/2007 |
| WO | 2008/009853 | 1/2008 |

OTHER PUBLICATIONS

*G. vector: Proposal for downstream FEXT cancellation method*, ITU—Telecommunication Standardization Sector, Study Group 15, Red Bank, New Jersey, Oct. 8-12, 2007 (8 pp.).

*G. vdsl: Channel Estimation by "Abuse" of Receivers*, ITU—Telecommunication Standardization Sector, Study Group 15, Shenzhen, China, Apr. 24-28, 2006, pp. 1-4.

Le Masson, J. et al., *Channel Estimation using Data and Pilots for a Coordinated DSL System*, IEEE GLOBECOM 2007, pp. 2868-2872.

International Search Report, mailed Jun. 18, 2009, in corresponding International Application No. PCT/CN2009/071246 (4 pp.).

J. Louveaux et al., "Error Sign Feedback as an Alternative to Pilots for the Tracking of FEXT Transfer Functions in Downstream VDSL", EURASIP Journal on Applied Signal Processing, vol. 2006, Article ID 94105, pp. 1-14.

Upzide Labs, "G.vds12: Pilot sequence assisted vector channel estimation" International Telecommunication Union, Study Group 15—Contribution 177, Oct. 2006, pp. 1-6.

Jérôme Louveaux et al., "Adaptive DSL Crosstalk Precancellation Design Using Low-Rate Feedback From End Users", IEEE Signal Processing Letters, vol. 13, No. 11, Nov. 2006, pp. 665-668.

Written Opinion of the International Searching Authority mailed Jun. 18, 2009 issued in corresponding International Patent Application No. PCT/CN2009/071246.

European Search Report dated Dec. 9, 2011 issued in corresponding European Patent Application No. 09765344.8.

Second Chinese Office Action issued Jan. 6, 2013 in corresponding Chinese Patent Application No. 200810067958.7 (4 pages) (6 pages Partial translation).

Chinese Office Action issued Jul. 30, 2012, including Chinese search report, in corresponding Chinese patent application 200810067958.7 (6 pages) (4 pages English translation).

Chinese Office Action mailed Jun. 3, 2013 in corresponding Chinese Patent Application No. 200810067958.7 (4 pages) (8 pages English Translation).

* cited by examiner

METHOD, APPARATUS, AND SYSTEM FOR CHANNEL ESTIMATION

CROSS-REFERENCE TO RELATED APPLICATIONS

This application is a continuation of International Application No. PCT/CN2009/071246, filed on Apr. 13, 2009, which claims priority to Chinese Patent Application No. 200810067958.7, filed on Jun. 20, 2008, both of which are hereby incorporated by reference in their entireties.

FIELD OF THE TECHNOLOGY

The present invention relates to the field of communications technologies, and more particularly to a method, an apparatus, and a system for channel estimation.

BACKGROUND OF THE INVENTION

X Digital Subscriber Line (xDSL) is a technology for high speed data transmission on a telephone twist pair, that is, an Unshielded Twist Pair (UTP). Except for the DSL based on baseband transmission, the xDSL based on passband transmission utilizes the frequency-division multiplexing technology, so that the xDSL and the Plain Old Telephone Service (POTS) coexist on the same twist pair. The xDSL occupies the high frequency band, and the POTS occupies the baseband part below 4 KHz. The POTS signals and the xDSL signals are separated by a splitter. The xDSL based on passband transmission uses the Discrete Multitone Modulation (DMT).

With the improvement of the frequency band used by the xDSL technology, the crosstalk, especially the crosstalk in the high frequency band, becomes prominent. The uplink and downlink channels of xDSL use the frequency-division multiplexing. The Near-End CrossTalk (NEXT) may hardly affect the performance of the system, while the Far-End CrossTalk (FEXT) will affect the transmission performance of the line seriously. As a result, when a plurality of subscribers in the same cable requires activating the xDSL service, the FEXT may cause a low speed on some lines, an unstable performance, or even an unactivable service. The outgoing line ratio of a DSL access multiplexer (DSLAM) is low.

SUMMARY OF THE INVENTION

The present invention is directed to a method, an apparatus, and a system for channel estimation, where a convergence speed of the channel estimation is improved by reducing data of error signals returned by a terminal.

In an embodiment, the present invention provides a method for channel estimation, which includes the following steps.

An error signal returned by a terminal is received, where the error signal is an error signal of at least two tones in a downlink frequency band.

Channels of the at least two tones are obtained according to the error signal.

The channels of the at least two tones are interpolated, and channels of remaining tones in the downlink frequency band are obtained.

In an embodiment, the present invention further provides an apparatus for channel estimation, which includes a receiving unit, a first channel acquisition unit, and a second channel acquisition unit.

The receiving unit is configured to receive an error signal returned by a terminal, where the error signal is an error signal of at least two tones in a downlink frequency band.

The first channel acquisition unit is configured to obtain channels of the at least two tones according to the error signal received by the receiving unit.

The second channel acquisition unit is configured to interpolate the channels of the at least two tones, and obtain channels of remaining tones in the downlink frequency band.

In an embodiment, the present invention further provides a DSL system, which includes a terminal and an access device.

The terminal is configured to return an error signal to the access device, where the error signal is an error signal of at least two tones in a downlink frequency band.

The access device is configured to receive the error signal returned by the terminal, obtain channels of the at least two tones according to the received error signal, interpolate the channels of the at least two tones, and obtain channels of remaining tones in the downlink frequency band.

In the method, the apparatus, and the system for channel estimation provided in the embodiments of the present invention, the convergence speed of the channel estimation is improved by reducing data of error signals returned by the terminal.

DETAILED DESCRIPTION OF THE EMBODIMENTS

Figure 1:
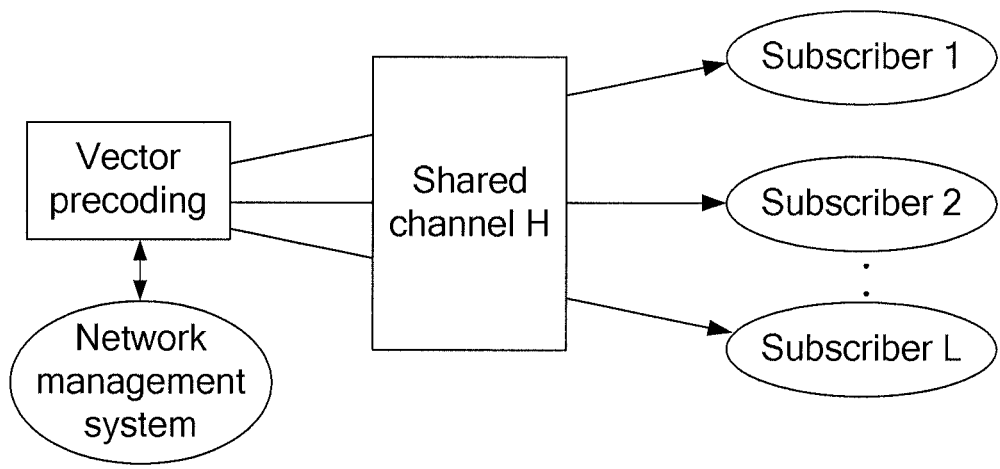
FIG. 1 is a schematic structural view of an existing DSLAM which synchronously sends signals.
Figure 2:
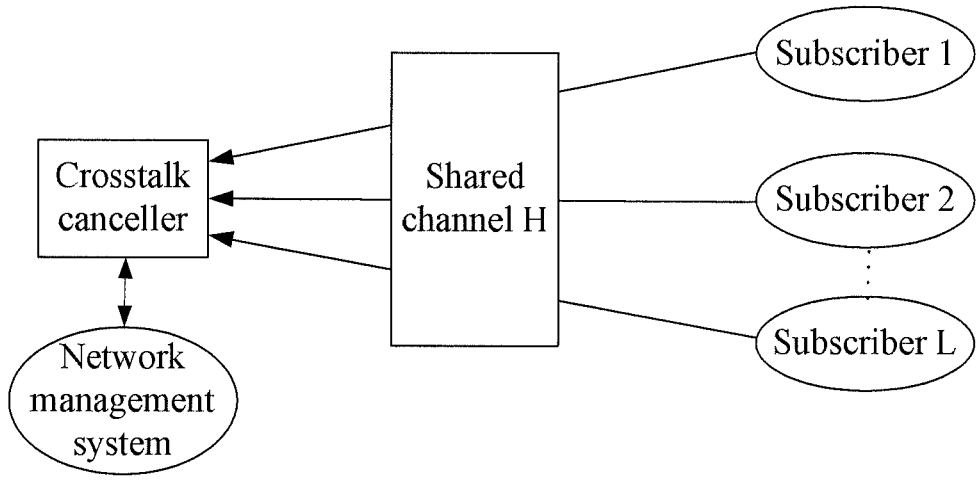
FIG. 2 is a schematic structural view of an existing DSLAM which synchronously receives signals.

The vectored-DSL technology mainly uses the possibility of performing joint transmission and reception at the DSLAM end and uses the signal processing method to cancel interference of the FEXT, so that no interference of the FEXT exists in each signal. FIG. 1 is a schematic structural view of synchronously sending signals by an existing DSLAM. FIG. 2 is a schematic structural view of synchronously receiving signals by the existing DSLAM.

A shared channel H shown in FIG. 1 and FIG. 2 may be represented by a matrix in a frequency domain as follows:

$$H^k = \begin{bmatrix} H_{11}^k & H_{12}^k & \cdots & H_{1N}^k \\ H_{21}^k & H_{22}^k & \cdots & H_{2N}^k \\ \vdots & \vdots & \ddots & \vdots \\ H_{N1}^k & H_{N2}^k & \cdots & H_{NN}^k \end{bmatrix}_{N \times N}$$

where $H_{ij}^k$ ($1 \leq i \leq N, 1 \leq j \leq N$) represents a crosstalk channel transfer function of a line pair j to a line pair i on a $k^{th}$ tone, $H_{ij}^k$, ($1 \leq i \leq N$) represents a direct channel transfer function of the line pair i on the $k^{th}$ tone, and N is the number of line pairs, that is, the number of subscribers. Then, H is an N×N channel transmission matrix. For seek of convenience, the superscript k is omitted in the following description. Further, it is assumed that X is an N×1 channel input vector, Y is an N×1 channel output vector, and N is an N×1 channel noise vector. Finally, the channel transmission equation is represented as follows.

$$Y = HX + N$$

For the uplink, a joint receiving process of the signal is performed at a Central Office (CO), a crosstalk canceller W is introduced at a receiving end, and the received signal is as follows.

$$\tilde{Y} = WY = WHX + WN$$

If the crosstalk canceller enables WH to be a diagonal matrix, the crosstalk can be eliminated.

For the downlink, a joint sending process of the signal is performed at the CO end, a precoder P is introduced at the CO end, and the signal received at the receiving end is as follows.

$$\tilde{Y} = HPX + N$$

If the crosstalk precoder enables HP to be a diagonal matrix, the crosstalk can be eliminated.

The method for computing the crosstalk canceller and the crosstalk precoder includes a first-order approximation method, where the computation is performed according to the channel transmission matrix. Therefore, in order to eliminate the crosstalk, the crosstalk channel needs to be firstly estimated, thereby obtaining the channel transmission matrix.

For the uplink, the crosstalk channel is estimated at the CO end, so that the implementation is easy. For the downlink, the joint processing is performed only at the CO end, and the downlink crosstalk channel further needs to be estimated at the CO end, so that the terminal needs to cooperate to return error signals to the CO end. The CO end estimates the crosstalk channel by using the error signals returned by the terminal, and then computes the precoder according to the obtained crosstalk channel. The error signals are returned through a feedback channel by using the uplink channel, so that certain uplink channel capacity is occupied. A convergence speed of the channel estimation depends on the capacity of the feedback channel and data of the returned error signals.

A convergence speed of channel estimation may be improved by increasing a channel capacity of a feedback channel or by reducing data of error signals returned by a terminal Customer Premise Equipment (CPE). When the channel capacity of the feedback channel is increased, a large overhead is resulted, and a data transmission efficiency is lowered, so that certain losses are caused. In embodiments of the present invention, the channel estimation is performed by reducing the data of the error signals returned by the terminal.

Figure 3:
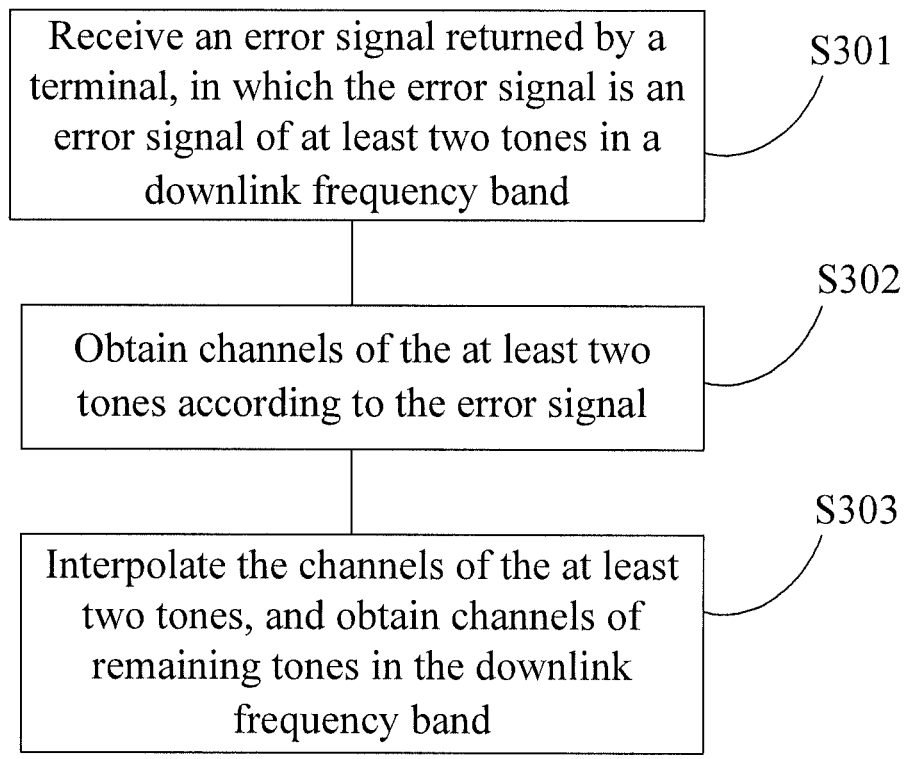
FIG. 3 is a flow chart of a method for channel estimation according to an embodiment of the present invention.

Referring to FIG. 3, a method for channel estimation provided in an embodiment of the present invention includes the following steps.

In step S301, an error signal returned by a terminal is received, where the error signal is an error signal of at least two tones in a downlink frequency band.

In step S302, channels of the at least two tones are obtained according to the error signal.

In step S303, the channels of the at least two tones are interpolated, and channels of remaining tones in the downlink frequency band are obtained.

The method for channel estimation provided in the embodiment of the present invention is described in detail with reference to the accompanying drawings as follows.

In step S301, an error signal returned by a terminal is received, where the error signal is an error signal of at least two tones in a downlink frequency band.

The downlink frequency band is divided into a plurality of tones, and characteristics of channels adjacent to the tones are similar. Due to the characteristic, it is possible to not estimate the channel of each tone during the channel estimation, but to estimate the channels of a part of the tones, that is, at least two tones, where the channel of the tone includes amplitude and phase information.

For example, for a Very High Speed Digital Subscriber Line 2 (VDSL2), it is assumed that the downlink frequency band DS1 is $f_1$-$f_2$, DS2 is $f_3$-$f_4$, and a tone spacing is $\Delta f$. Downlink tones are $K_1^{th}$ tone to $K_2^{th}$ tone and $K_3^{th}$ tone to $K_4^{th}$ tone.

Firstly, tones configured to return an error signal are selected. The error signal to be returned may be selected by the terminal or a sending end. Here, an error signal is returned for channel estimation every other M−1 tones (namely, every M tones), that is, the $(k_1 + M \times (i-1))^{th}$ tone $$\left( i = 1, \ldots, \left\lfloor \frac{k_2 - k_1}{M} + 1 \right\rfloor \right)$$

and the $(k_3 + M \times (i-1))^{th}$ tone $$\left( i = 1, \ldots, \left\lfloor \frac{k_4 - k_3}{M} + 1 \right\rfloor \right),$$

where $\lfloor \bullet \rfloor$ represents rounding down.

In step S302, channels of the at least two tones are obtained according to the error signal returned by the terminal in step S301.

When the channels of the tones are acquired, the channels may be computed by using, but certainly not limited to, an orthogonal sequence based method. The description is given as follows by taking the orthogonal sequence based method as an example.

A real part and an imaginary part of the returned error signal are respectively modulated by two orthogonal sequences as follows.

$$u_n(\lambda) = Re\{u_0\} S1_n(\lambda) + jIm\{u_0\} S2_n(\lambda)$$

The orthogonal sequences of different lines are pairwise orthogonal, and the orthogonal sequences of the real part and the imaginary part are also pairwise orthogonal.

$$\sum_{\lambda=1}^{L} Si_n(\lambda) Sj_m(\lambda) = \begin{cases} 0, & m \neq n \text{ or } i \neq j \\ 1, & m = n \text{ and } i = j, \ i, \ j \in \{1, 2\} \end{cases}$$

Assume a normalized channel $$\bar{H}_{nm} = \frac{H_{nm}}{H_{nn}} = a_m + jb_m, \quad (m \neq n, \ m = 1, 2, \ldots, N),$$

and a decision error is obtained as follows.

$$e_n(\lambda) = \sum_{\substack{m=1 \\ m \neq n}}^{N} \overline{H}_{nm} u_m(\lambda)$$

$$= \sum_{\substack{m=1 \\ m \neq n}}^{N} (a_m + jb_m)[\text{Re}\{u_0\}S1_m(\lambda) + j\text{Im}\{u_0\}S2_m(\lambda)]$$

$$= \sum_{\substack{m=1 \\ m \neq n}}^{N} \left[ \begin{array}{l} (a_m \text{Re}\{u_0\}S1_m(\lambda) - b_m \text{Im}\{u_0\}S2_m(\lambda)) + \\ j(a_m \text{Im}\{u_0\}S2_m(\lambda) + b_m \text{Re}\{u_0\}S1_m(\lambda)) \end{array} \right]$$

The channel can be obtained through the real part or the imaginary part of the error signal, and if the real part of the error signal is returned:

$$\text{Re}\{e_n(\lambda)\} = \sum_{\substack{m=1 \\ m \neq n}}^{N} [a_m \text{Re}\{u_0\}S1_m(\lambda) - b_m \text{Im}\{u_0\}S2_m(\lambda)]$$

the real part of the channel of a subscriber i to a subscriber n is computed according to the real part of the error signal as follows.

$$\sum_{\lambda=1}^{L} \text{Re}\{e_n(\lambda)\} \cdot S1_i(\lambda) = \sum_{\lambda=1}^{L} \sum_{\substack{m=1 \\ m \neq n,i}}^{N} a_m \text{Re}\{u_0\}S1_m(\lambda) \cdot S1_i(\lambda) -$$

$$\sum_{\substack{m=1 \\ m \neq n}}^{N} b_m \text{Im}\{u_0\}S2_m(\lambda) \cdot S1_i(\lambda) +$$

$$\sum_{\lambda=1}^{L} a_i \text{Re}\{u_0\}S1_i(\lambda) \cdot S1_i(\lambda)$$

$$= a_i \text{Re}\{u_0\}$$

The real part of the normalized channel is obtained as follows.

$$a_i = \frac{\sum_{\lambda=1}^{L} \text{Re}\{e_n(\lambda)\} \cdot S1_i(\lambda)}{\text{Re}\{u_0\}}$$

Similarly, the imaginary part of the normalized channel of the subscriber i to the subscriber n is obtained as follows.

$$b_i = -\frac{\sum_{\lambda=1}^{L} \text{Re}\{e_n(\lambda)\} \cdot S2_i(\lambda)}{\text{Im}\{u_0\}}$$

Therefore, the normalized channel is obtained.

Similarly, if the imaginary part of the error signal is returned, the normalized channel can also be computed.

In step S303, the channels of the at least two tones obtained in step S302 are interpolated, and channels of remaining tones in the downlink frequency band are obtained.

Specifically, the channels of the remaining tones may be computed by using an interpolation function. The interpolation function may be, but not limited to, a linear interpolation function or a Gaussian interpolation function. Two interpolation methods exist.

In a first interpolation method, the channels of the at least two tones obtained in step S302 are interpolated, so as to obtain channels of all the tones. If the linear interpolation function is adopted, it is obtained that:

$$\hat{H}[k_1 + M \times (i-1) + m] = \frac{M-m}{M}\hat{H}[k_1 + M \times (i-1)] + \frac{m}{M}\hat{H}[k_1 + M \times i],$$

$$i = 1, \ldots, \left\lfloor \frac{k_2 - k_1}{M} + 1 \right\rfloor$$

$$\hat{H}[k_3 + M \times (i-1) + m] = \frac{M-m}{M}\hat{H}[k_3 + M \times (i-1)] + \frac{m}{M}\hat{H}[k_3 + M \times i],$$

$$i = 1, \ldots, \left\lfloor \frac{k_4 - k_3}{M} + 1 \right\rfloor$$

where $m = 1, \ldots, M-1$.

In a second interpolation method, amplitude information and phase information of the channels of the at least two tones obtained in step S302 are respectively interpolated, and amplitudes and phases of the remaining tones in the downlink frequency band are obtained, so as to obtain the channels of all the tones. If the linear interpolation function is adopted, the amplitude is obtained as follows:

$$|\hat{H}[k_1 + M \times (i-1) + m]| =$$
$$\frac{M-m}{M}|\hat{H}[k_1 + M \times (i-1)]| + \frac{m}{M}|\hat{H}[k_1 + M \times i]|,$$

$$i = 1, \ldots, \left\lfloor \frac{k_2 - k_1}{M} + 1 \right\rfloor$$

$$|\hat{H}[k_3 + M \times (i-1) + m]| =$$
$$\frac{M-m}{M}|\hat{H}[k_3 + M \times (i-1)]| + \frac{m}{M}|\hat{H}[k_3 + M \times i]|,$$

$$i = 1, \ldots, \left\lfloor \frac{k_4 - k_3}{M} + 1 \right\rfloor$$

where $|\hat{H}(i)|$ represents a channel amplitude of the $i^{th}$ tone, and $m=1, \ldots, M-1$.

The phase is as follows:

$$\hat{\Phi}[k_1 + M \times (i-1) + m] = \frac{M-m}{M}\hat{\Phi}[k_1 + M \times (i-1)] + \frac{m}{M}\hat{\Phi}[k_1 + M \times i],$$

$$i = 1, \ldots, \left\lfloor \frac{k_2 - k_1}{M} + 1 \right\rfloor$$

$$\hat{\Phi}[k_3 + M \times (i-1) + m] = \frac{M-m}{M}\hat{\Phi}[k_3 + M \times (i-1)] + m\hat{\Phi}[k_3 + M \times i],$$

$$i = 1, \ldots, \left\lfloor \frac{k_4 - k_3}{M} + 1 \right\rfloor$$

where $\hat{\Phi}[i]$ represents a channel phase of the $i^{th}$ tone, and $m=1, \ldots, M-1$ Finally, the channels of all the tones are obtained according to the computed channel amplitude and phase values.

$$\hat{H}(i) = |\hat{H}(i)| \exp(j\hat{\Phi}(i)), i = k_1, \ldots, k_2, k_3, \ldots, k_4$$

The method provided in the embodiment of the present invention is emulated as follows with reference to instances. The emulation is performed by using a VDSL2 crosstalk channel having a line length of 300 m and a coupling length of 300 m. The adopted interpolation function is the linear interpolation function. The crosstalk channel is measured data. The downlink frequency band DS1 is 276 kHz-3.75 MHz, DS2 is 5.2 MHz-8.5 MHz, and a tone spacing is 43125 kHz. The downlink tones are $64^{th}$ tone to $870^{th}$ tone, and $1205^{th}$ tone to $1970^{th}$ tone.

Figure 4:
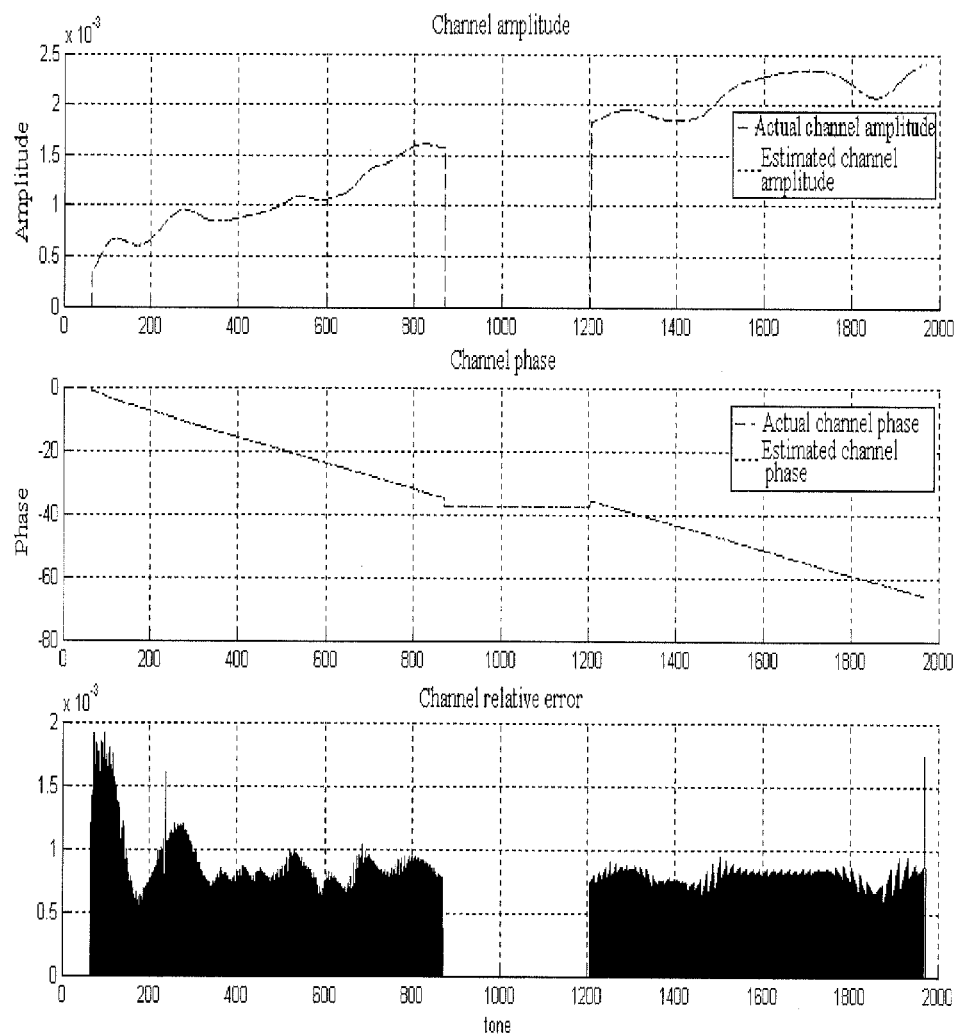
FIG. 4 is curve diagrams of channel amplitudes, phases, and errors obtained by using a first interpolation method according to an embodiment of the present invention.

FIG. 4 is curve diagrams of amplitudes, phases, and errors of the actual channel and the channel estimated by using the first interpolation method, where the emulation is performed in the case that M=2. In FIG. 4, the channel amplitude represents amplitude information of the crosstalk channel, a dot-and-dash line - . - . - . represents the actually measured amplitude of the channel, and a dash line . . . represents the amplitude of the crosstalk channel computed by adopting the embodiment of the present invention; the channel phase represents the phase information of the crosstalk channel, - . - . - . represents the actually measured phase of the channel, and . . . represents the amplitude of the crosstalk channel computed by adopting the embodiment of the present invention. It can be known from FIG. 4 that, the amplitude and the phase of the channel computed by adopting the embodiment of the present invention are basically the same as the actually measured amplitude and phase of the channel. FIG. 4 further shows an error curve between the actual channel and the channel computed by adopting the embodiment of the present invention. Similarly, it can be known that relative errors are below 2e-3. The relative errors of all the tones are averaged to obtain an average relative error being 4.2757e-004.

Figure 5:
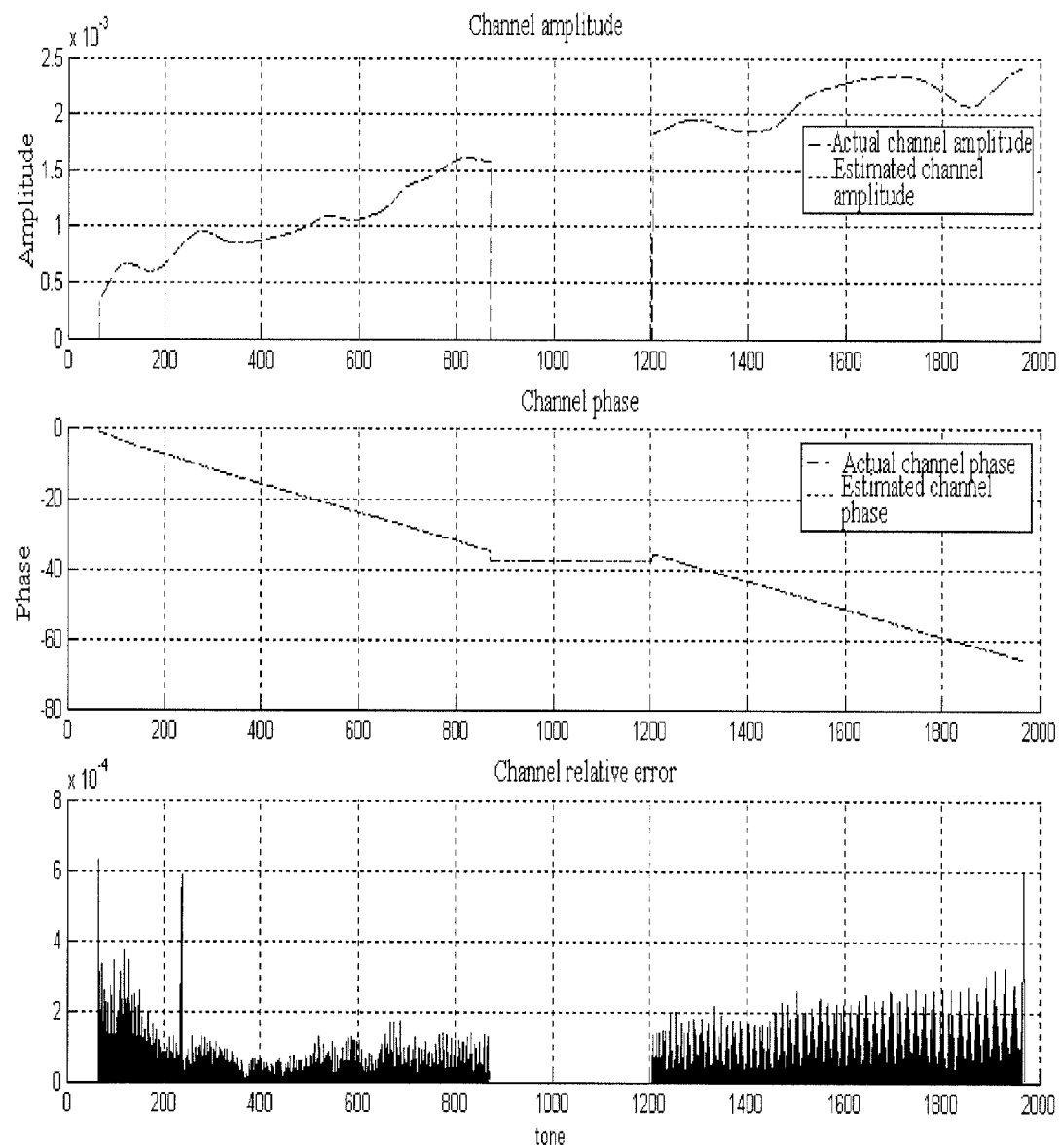
FIG. 5 is curve diagrams of channel amplitudes, phases, and errors obtained by using a second interpolation method according to an embodiment of the present invention.

FIG. 5 is curve diagrams of amplitudes, phases, and errors of the actual channel and the channel estimated by using the second interpolation method, where the emulation is performed in the case that M=2. In FIG. 5, the channel amplitude represents amplitude information of the crosstalk channel, - . - . - . represents the actually measured amplitude of the channel, and . . . represents the amplitude of the crosstalk channel computed by adopting the embodiment of the present invention; the channel phase represents the phase information of the crosstalk channel, - . - . - . represents the actually measured phase of the channel, and . . . represents the amplitude of the crosstalk channel computed by adopting the embodiment of the present invention. It can be known from FIG. 5 that, the amplitude and the phase of the channel computed by adopting the embodiment of the present invention are basically the same as the actually measured amplitude and phase of the channel. FIG. 5 further shows an error curve between the actual channel and the channel computed by adopting the embodiment of the present invention. Similarly, it can be known that relative errors are below 7e-4. The relative errors of all the tones are averaged to obtain an average relative error being 5.4587e-005.

It can be known from the above results that if an error signal is returned every 2 tones, the error is small, but the returned data amount is reduced to ½ of the original data amount, so that the returned data amount is greatly lowered, and the convergence speed of the channel estimation algorithm is greatly improved.

If the emulation is performed in the case that M=6, an average relative error between the actual channel and the channel estimated by using the first interpolation method is 0.0050, and an average relative error between the actual channel and the channel estimated by using the second interpolation method is 5.3223e-004. Here, the returned error data amount is reduced to ⅙ of the original data amount.

The channel in the embodiment of the present invention may be configured to estimate a crosstalk channel or a direct channel.

Figure 6:
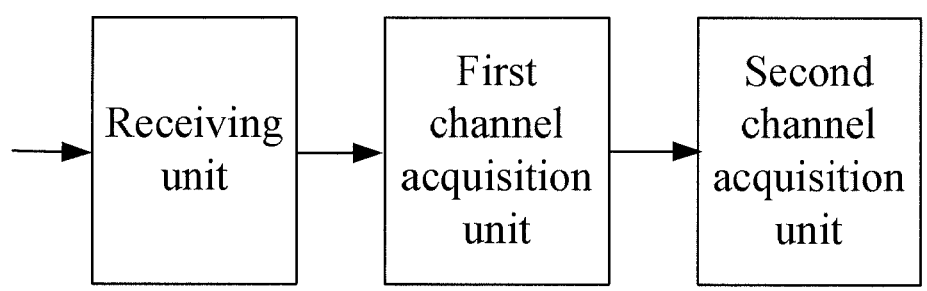
FIG. 6 is a schematic view of an apparatus for channel estimation according to an embodiment of the present invention.

Referring to FIG. 6, the present invention further provides an apparatus for channel estimation in an embodiment, which includes a receiving unit, a first channel acquisition unit, and a second channel acquisition unit.

The receiving unit is configured to receive an error signal returned by a terminal, where the error signal is an error signal of at least two tones in a downlink frequency band. The first channel acquisition unit is configured to obtain channels of the at least two tones according to the error signal received by the receiving unit. The second channel acquisition unit is configured to interpolate the channels of the at least two tones, and obtain channels of remaining tones in the downlink frequency band.

The specific implementation manner is as described in the embodiments of the method, and thus will not be described in detail here.

Further, the second channel acquisition unit includes an interpolation unit and an acquisition unit. The interpolation unit is configured to interpolate the channels of the at least two tones obtained by the first channel acquisition unit. The acquisition unit is configured to obtain the channels of the remaining tones according to interpolation results of the interpolation unit.

Further, the interpolation unit includes a first interpolation unit and a second interpolation unit. The first interpolation unit is configured to interpolate amplitudes of the channels of the at least two tones obtained by the first channel acquisition unit. The second interpolation unit is configured to interpolate phases of the channels of the at least two tones obtained by the first channel acquisition unit. The acquisition unit is configured to obtain the channels of the remaining tones in the downlink frequency band according to amplitude values obtained by the first interpolation unit and phase values obtained by the second interpolation unit.

The interpolation method may adopt, but not limited to, a linear interpolation function or a Gaussian interpolation function.

The apparatus for channel estimation may be integrated in a DSLAM.

Figure 7:
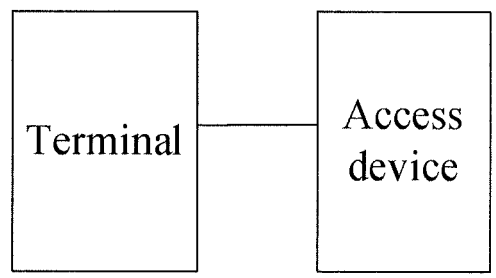
FIG. 7 is a schematic structural view of a DSLAM according to an embodiment of the present invention.

Referring to FIG. 7, the present invention further provides a DSL system in an embodiment, which includes a terminal and an access device.

The terminal is configured to return an error signal to the access device, where the error signal is an error signal of at least two tones in a downlink frequency band.

The access device is configured to receive the error signal returned by the terminal, obtain channels of the at least two tones according to the received error signal, interpolate the channels of the at least two tones, and obtain channels of remaining tones in the downlink frequency band.

The access device includes a receiving unit, a first channel acquisition unit, and a second channel acquisition unit. The receiving unit is configured to receive the error signal returned by the terminal. The first channel acquisition unit is configured to obtain the channels of the at least two tones according to the error signal received by the receiving unit. The second channel acquisition unit is configured to interpolate the channels of the at least two tones, and obtain the channels of the remaining tones in the downlink frequency band.

Further, the second channel acquisition unit includes an interpolation unit and an acquisition unit. The interpolation unit is configured to interpolate the channels of the at least two tones obtained by the first channel acquisition unit. The acquisition unit is configured to obtain the channels of the remaining tones according to interpolation results of the interpolation unit.

Further, the interpolation unit includes a first interpolation unit and a second interpolation unit. The first interpolation unit is configured to interpolate amplitudes of the channels of the at least two tones obtained by the first channel acquisition unit. The second interpolation unit is configured to interpolate phases of the channels of the at least two tones obtained by the first channel acquisition unit. The acquisition unit is configured to obtain the channels of the remaining tones according to amplitude values obtained by the first interpolation unit and phase values obtained by the second interpolation unit.

The interpolation method may adopt, but not limited to, a linear interpolation function or a Gaussian interpolation function.

The access device may be a DSLAM.

Person having ordinary skill in the art may understand that all or part of the steps of the method according to the embodiments of the present invention may be implemented by a program instructing relevant hardware. The program may be stored in a computer readable storage medium.

The storage medium may be a Read-Only Memory (ROM), a magnetic disk, or a Compact Disk Read-Only Memory (CD-ROM).

It should be noted that the above embodiments are merely provided for elaborating the technical solutions of the present invention, but not intended to limit the present invention. Although the present invention has been described in detail with reference to the foregoing embodiments, it is apparent that those skilled in the art can make various modifications or equivalent replacements to the technical solutions of the invention without departing from the spirit and scope of the invention. Any modification, equivalent replacement, or improvement made without departing from the spirit and principle of the present invention should fall within the scope of the present invention.

What is claimed is:

1. A method for channel estimation, comprising:
receiving an error signal returned by a terminal, wherein the error signal is an error signal of at least two tones every other M−1 tones from $k_1^{th}$ tone to $k_2^{th}$ tone in a downlink frequency band, wherein M is an integer with M>1;
obtaining crosstalk channel transfer functions of channels of the at least two tones according to the error signal of the at least two tones; and
obtaining crosstalk channel transfer functions of channels of remaining tones between the at least two tones in the downlink frequency band by interpolating amplitudes and phases of the channels of the at least two tones with the formulas:

$$|\hat{H}[k_1 + M \times (i-1) + m]| = \frac{M-m}{M}|\hat{H}[k_1 + M \times (i-1)]| + \frac{m}{M}|\hat{H}[k_1 + M \times i]|,$$

$$i = 1, \ldots, \left\lfloor \frac{k_2 - k_1}{m} + 1 \right\rfloor,$$

where $|\hat{H}(i)|$ represents a channel amplitude of the $i^{th}$ tone, and m>1, ..., M−1;

$$\hat{\Phi}[k_1 + M \times (i-1) + m] = \frac{M-m}{M}\hat{\Phi}[k_1 + M \times (i-1)] + \frac{m}{M}\hat{\Phi}[k_1 + M \times i],$$

$$i = 1, \ldots, \left\lfloor \frac{k_2 - k_1}{m} + 1 \right\rfloor,$$

where $\hat{\Phi}\{i\}$ represents a channel phase of the $i^{th}$ tone.

2. The method for channel estimation according to claim 1, wherein the interpolating comprises interpolating by using a linear interpolation function or a Gaussian interpolation function.

3. The method for channel estimation according to claim 1, wherein the obtaining the crosstalk channel transfer functions of the channels of the at least two tones comprises acquiring the crosstalk channel transfer functions of the tones by using an orthogonal sequence method.

4. An apparatus for channel estimation for a terminal, comprising:
a receiving unit, configured to receive an error signal returned by the terminal, wherein the error signal is an error signal of at least two tones every other M−1 tones from $k_1^{th}$ tone to $k_2^{th}$ tone in a downlink frequency band, wherein M is an integer with M>1;
a first channel acquisition unit, configured to obtain crosstalk channel transfer functions of channels of the at least two tones according to the error signal of the at least two tones received by the receiving unit; and
a first interpolation unit, configured to interpolate amplitudes of channels between the channels of the at least two tones obtained by the first channel acquisition unit with the formulas:

$$|\hat{H}[k_1 + M \times (i-1) + m]| = \frac{M-m}{M}|\hat{H}[k_1 + M \times (i-1)]| + \frac{m}{M}|\hat{H}[k_1 + M \times i]|,$$

$$i = 1, \ldots, \left\lfloor \frac{k_2 - k_1}{m} + 1 \right\rfloor,$$

where $|\hat{H}(i)|$ represents a channel amplitude of the $i^{th}$ tone, and m=1, ..., M−1; and a second interpolation unit, configured to interpolate phases of crosstalk channel transfer functions between the channels of the at least two tones obtained by the first channel acquisition unit with the formulas:

$$\hat{\Phi}[k_1 + M \times (i-1) + m] = \frac{M-m}{M}\hat{\Phi}[k_1 + M \times (i-1)] + \frac{m}{M}\hat{\Phi}[k_1 + M \times i],$$

$$i = 1, \ldots, \left\lfloor \frac{k_2 - k_1}{m} + 1 \right\rfloor,$$

where $\hat{\Phi}\{i\}$ represents a channel phase of the $i^{th}$ tone.

5. The apparatus for channel estimation according to claim 4, further comprising an acquisition unit, wherein the acquisition unit is configured to obtain the crosstalk channel transfer functions of the channels of the remaining tones in the downlink frequency band according to amplitude values obtained by the first interpolation unit and phase values obtained by the second interpolation unit.

6. The apparatus for channel estimation according to claim 4, wherein the apparatus is integrated in a digital subscriber line access multiplexer (DSLAM).

7. The apparatus for channel estimation according to claim 5, wherein the apparatus is integrated in a digital subscriber line access multiplexer (DSLAM).

8. A digital subscriber line (DSL) system, comprising:
a terminal, configured to return an error signal to an access device, wherein the error signal is an error signal of at least two tones every other M−1 tones from $k_1{}^{th}$ tone to $k_2{}^{th}$ tone in a downlink frequency band, wherein M is an integer with M>1; and
the access device, configured to receive the error signal returned by the terminal, obtain crosstalk channel transfer functions of channels of the at least two tones according to the received error signal of the at least two tones, and obtain crosstalk channel transfer functions of channels of remaining tones between the at least two tones in the downlink frequency band by interpolating amplitudes and phases of the channels of the at least two tones with the formulas:

$$|\hat{H}[k_1 + M \times (i-1) + m]| = \frac{M-m}{M}|\hat{H}[k_1 + M \times (i-1)]| + \frac{m}{M}|\hat{H}[k_1 + M \times i]|,$$

$$i = 1, \ldots, \left\lfloor \frac{k_2 - k_1}{m} + 1 \right\rfloor,$$

where $|\hat{H}(i)|$ represents a channel amplitude of the $i^{th}$ tone, and m=1, ..., M−1;

$$\hat{\Phi}[k_1 + M \times (i-1) + m] = \frac{M-m}{M}\hat{\Phi}[k_1 + M \times (i-1)] + \frac{m}{M}\hat{\Phi}[k_1 + M \times i],$$

$$i = 1, \ldots, \left\lfloor \frac{k_2 - k_1}{m} + 1 \right\rfloor,$$

where $\hat{\Phi}\{i\}$ represents a channel phase of the $i^{th}$ tone.

9. The DSL system according to claim 8, wherein the access device comprises:
a receiving unit, configured to receive the error signal returned by the terminal;
a first channel acquisition unit, configured to obtain the crosstalk channel transfer functions of the channels of the at least two tones according to the error signal received by the receiving unit; and
a second channel acquisition unit, configured to interpolate between the channels of the at least two tones, and obtain the crosstalk channel transfer functions of the channels of the remaining tones in the downlink frequency band.

10. The DSL system according to claim 9, wherein the second channel acquisition unit comprises:
an interpolation unit, configured to interpolate between the channels of the at least two tones obtained by the first channel acquisition unit; and
an acquisition unit, configured to obtain the crosstalk channel transfer functions of the channels of the remaining tones in the downlink frequency band according to interpolation results of the interpolation unit.

11. The DSL system according to claim 10, wherein the interpolation unit comprises:
a first interpolation unit, configured to interpolate amplitudes of crosstalk channel transfer functions between the channels of the at least two tones obtained by the first channel acquisition unit; and
a second interpolation unit, configured to interpolate phases of crosstalk channel transfer functions between the channels of the at least two tones obtained by the first channel acquisition unit.

12. The DSL system according to claim 11, wherein the acquisition unit is configured to obtain the crosstalk channel transfer functions of the channels of the remaining tones in the downlink frequency band according to amplitude values obtained by the first interpolation unit and phase values obtained by the second interpolation unit.

13. A non-transitory computer readable medium that stores a computer program product comprising computer executable instructions that when executed implement the following:
receiving an error signal returned by a terminal, wherein the error signal is an error signal of at least two tones every other M−1 tones from $k_1{}^{th}$ tone to $k_2{}^{th}$ tone in a downlink frequency band, wherein M is an integer with M>1;
obtaining crosstalk channel transfer functions of channels of the at least two tones according to the error signal of the at least two tones; and
obtaining crosstalk channel transfer functions of channels of remaining tones between the at least two tones in the downlink frequency band by interpolating amplitudes and phases of the channels of the at least two tones with the formulas:

$$|\hat{H}[k_1 + M \times (i-1) + m]| = \frac{M-m}{M}|\hat{H}[k_1 + M \times (i-1)]| + \frac{m}{M}|\hat{H}[k_1 + M \times i]|,$$

$$i = 1, \ldots, \left\lfloor \frac{k_2 - k_1}{m} + 1 \right\rfloor,$$

where $|\hat{H}(i)|$ represents a channel amplitude of the $i^{th}$ tone, and m>1, ..., M−1;

$$\hat{\Phi}[k_1 + M \times (i-1) + m] = \frac{M-m}{M}\hat{\Phi}[k_1 + M \times (i-1)] + \frac{m}{M}\hat{\Phi}[k_1 + M \times i],$$

$$i = 1, \ldots, \left\lfloor \frac{k_2 - k_1}{m} + 1 \right\rfloor,$$

where $\hat{\Phi}\{i\}$ represents a channel phase of the $i^{th}$ tone.

* * * * *